United States Patent [19]

Bein

[11] 4,107,883

[45] Aug. 22, 1978

[54] APPARATUS FOR CONTROLLING FEED MECHANISMS OF GRINDING AND CUTTING APPARATUS

[76] Inventor: Kenneth E. Bein, 2518 Last Ave., Kingman, Ariz. 86401

[21] Appl. No.: 815,222

[22] Filed: Jul. 13, 1977

[51] Int. Cl.² ............................................. B24B 49/16
[52] U.S. Cl. ................................. 51/165.8; 51/165.92; 125/13 R
[58] Field of Search .......................... 51/165.8, 165.92; 125/13, 14

[56] References Cited

U.S. PATENT DOCUMENTS

| 2,460,386 | 2/1949 | Hillquist | 125/13 R |
| 3,136,098 | 6/1964 | Backer | 51/165.92 |
| 3,748,789 | 7/1973 | Wada | 51/165.8 |
| 3,906,681 | 9/1975 | Seidel | 51/165.92 |

*Primary Examiner*—Harold D. Whitehead
*Attorney, Agent, or Firm*—Warren F. B. Lindsley

[57] ABSTRACT

Apparatus for controlling infeed speed of a power screw feed system or the like for cutting and abrading materials in response to resistance sensed by the feed mechanism moving the material into contact with the machine tool.

5 Claims, 4 Drawing Figures

U.S. Patent     Aug. 22, 1978     4,107,883
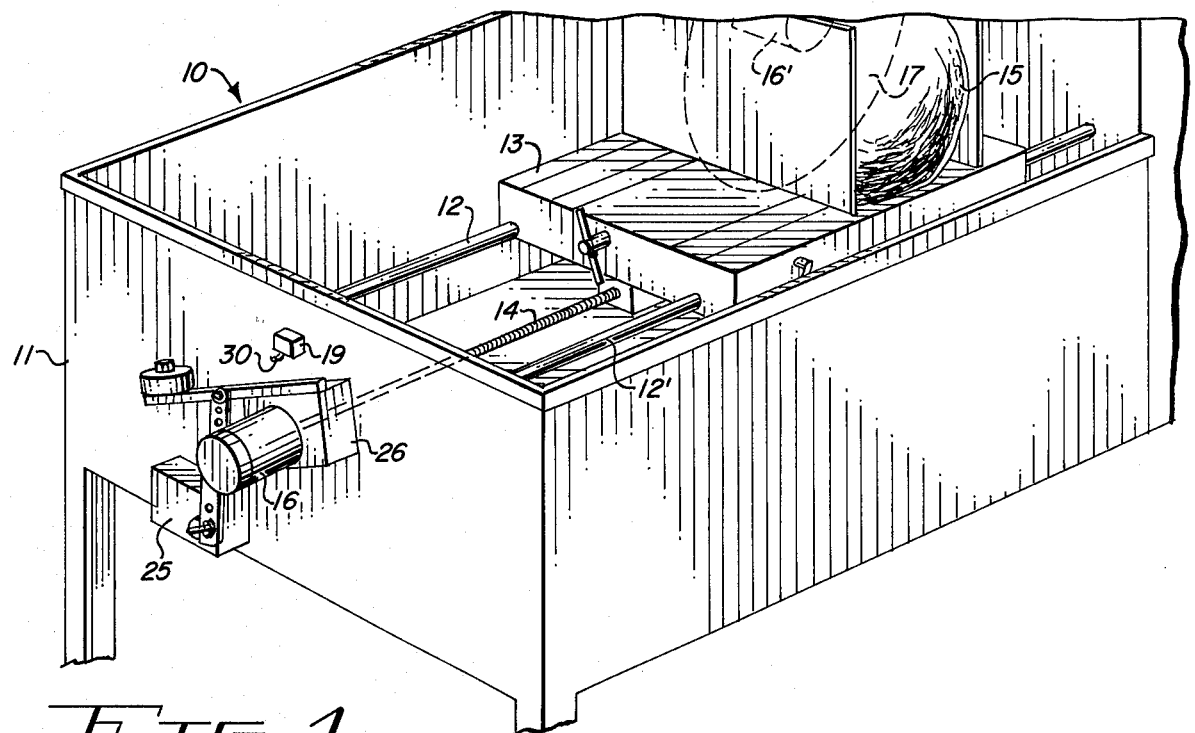
FIG-1
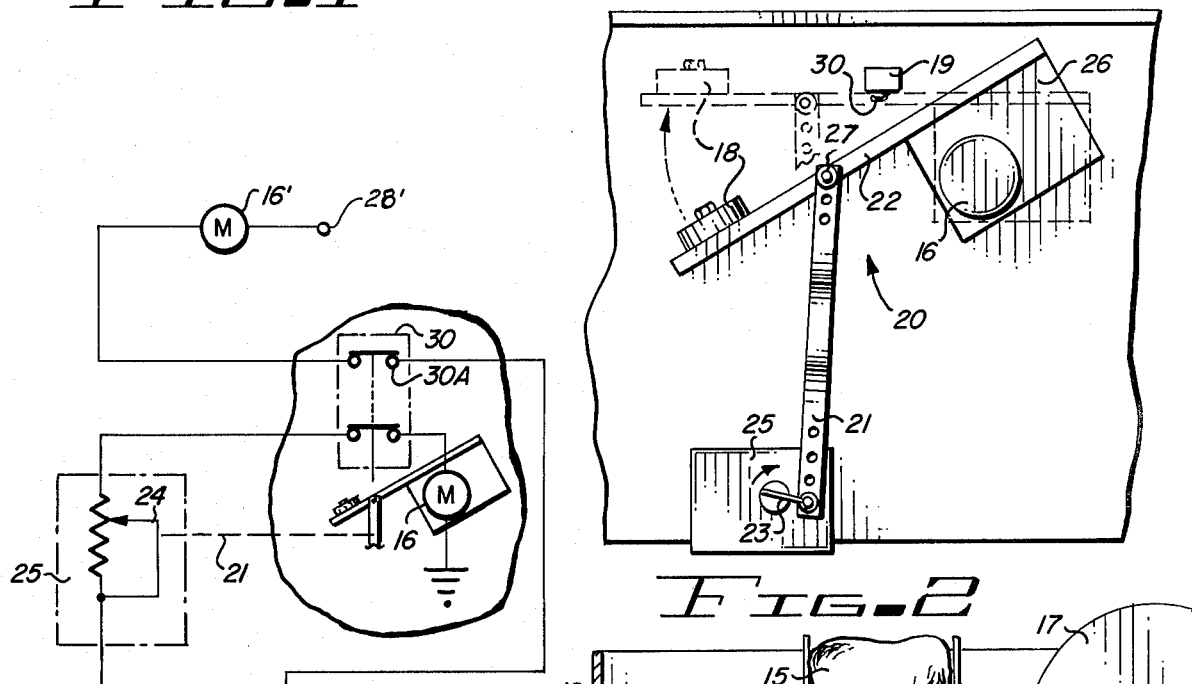
FIG-2
FIG-3
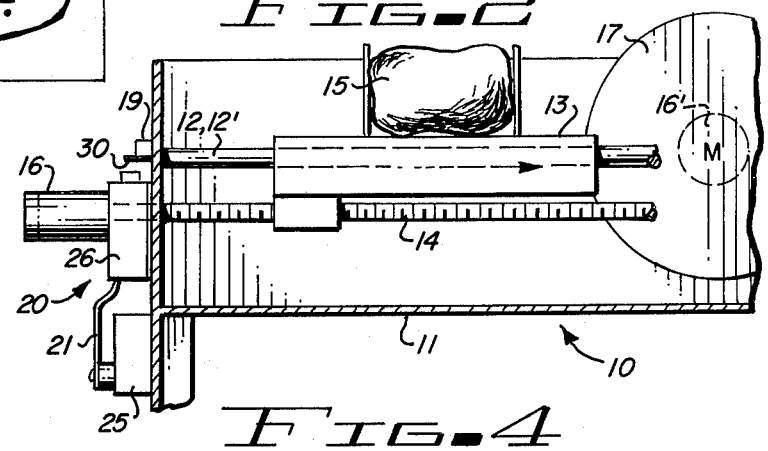
FIG-4

APPARATUS FOR CONTROLLING FEED MECHANISMS OF GRINDING AND CUTTING APPARATUS

BACKGROUND OF THE INVENTION

This invention relates to a grinding or cutting machine, and more particularly, to an improved control for the infeed mechanism of the machine which is capable of changing the speed of this mechanism responsive to the varying conditions of the material being worked on.

DESCRIPTION OF THE PRIOR ART

Heretofore, infeed speed controls have been provided for cutting and abrading tools including variable control of the pressure applied by the tools to the workpieces.

U.S. Pat. No. 2,774,191 discloses a cutting machine including an adjustable weight for varying pressure of a cutting blade on a workpiece.

U.S. Pat. No. 3,545,140 discloses a slab planar including means for controlling the power of the feed drive for maintaining a given drive load.

U.S. Pat. No. 3,748,789 discloses a grinding machine including means for automatically controlling the speed of a feed screw for a grinding wheel to maintain the grinding resistance within predetermined limits.

None of the known prior art disclose apparatus and control mechanisms therefore which varies the infeed speed of the material against a grinding and/or cutting tool which is responsive to the hardness of the various types of stones, the condition of the cutting teeth or grinding surface of the tool, and the size of the cut which will vary due to the irregular size and shape of the material being worked on.

SUMMARY OF THE INVENTION

In accordance with the invention claimed, an improved method and control is provided for the infeed mechanism of a cutting or grinding machine.

It is, therefore, one object of this invention to provide an improved method and apparatus for controlling the speed mechanism of a cutting and/or grinding machine utilizing torque reaction of the tool on the work for controlling the mechansim.

Another object of this invention is to provide an improved control mechanism for the infeed mechanism of a cutting or grinding machine which compensates for the hardness of the material being worked on and/or the sharpness of the cutting or grinding tool.

A further object of this invention is to provide an improved control for the infeed mechanism of a cutting and/or grinding machine which is capable of changing its speed of operation automatically from one optimum value to another optimum value or values depending on the properties of the material being worked on and/or the condition of the cutting or grinding tool.

A still further object of this invention is to provide an improved method and apparatus for changing the infeed speed of work against a cutting tool as a funtion of cutting resistance to control the cut in the work.

A still further object of this invention is to provide an improved infeed control for a cutting or grinding machine that is economical to operate, adjust, relatively inexpensive to manufacture and substantially maintenance-free.

Further objects and advantages of the invention will become apparent as the following description proceeds and the features of novelty which characterize the invention will be pointed out with particularity in claims annexed to and forming a part of this specification.

BRIEF DESCRIPTION OF THE DRAWING

The present invention may be more readily described by reference to the accompanying drawing, in which:

FIG. 1 is a partial perspective view of a cutting apparatus for use in the Lapidary field illustrating the control mechanism of the invention as applied to the power screw infeed mechanism of the apparatus;

FIG. 2 is a partial end view of the control mechanism shown in FIG. 1;

FIG. 3 is a wiring diagram of the control mechanism shown in FIGS. 1 and 2; and

FIG. 4 is a reduced cross-sectional longitudinal view of the cutting apparatus shown in FIG. 1.

DESCRIPTION OF THE PREFERRED EMBODIMENT

Referring more particularly to the drawing by characters of reference, FIG. 1 discloses a cutting machine 10 comprising an open box-like frame 11 having mounted therein a pair of longitudinally positioned spaced parallelly arranged guide rods or rails 12, 12' anchored in box 11. A table or work carrier 13 is movable longitudinally on rails 12, 12' in response to the rotational movement of a feed screw 14 which is longitudinally positioned in frame 11 below and parallelly arranged to rails 12, 12'.

The guide rails 12, 12' are rigidly secured to frame 11 so as to support carrier 13 and material 15 supported thereby and to absorb the reaction forces during working operation of the cutting machine.

The cutting machine further comprises a power means such as an electric motor 16 mounted on the outside of frame 11 operable to provide the driving force for moving the material 15 into contact with the work treating means, shown in FIG. 1 as comprising a rotatable saw blade 17, against which the material is moved in saw cutting arrangement by carrier 13.

The saw blade 17 is mounted on a shaft for rotation therewith and may extend laterally of the longitudinal axis of frame 11, as shown in FIGS. 1 and 4. It is obvious that the saw blade and its teeth may be formed of various materials; however, diamond type teeth or cutting wheels are preferred and needed for many materials worked on by the disclosed machine. It should be recognized that a suitable cutting or grinding fluid may be utilized for lubricating the cutting edge of the blade or grinding tool, but this structure has been omitted from the drawing for simplicity purposes since the invention is directed to the control mechanism.

As shown in the drawing, the output shaft of motor 16, which is a direct current motor, is coupled directly to feed screw 14 for axial rotation thereof and is supported by the feed screw on the outside of the end of frame 11 opposite to saw blade 17. Motor 16 is free to pivot on its output shaft with its motion controlled by an adjustable weight 18 and one or more stops 19 for limiting movement in either direction.

The speed of motor 16 is controlled by a linkage mechanism 20 comprising a pair of links 21 and 22 with link 21 connected to link 22 at a point between its ends. Link 21 is connected by an arm 23 to the moveable arm 24 of a potentiometer 25, as more clearly shown in FIGS. 2 and 3, the voltages output of which serves as a variable voltage power supply for motor 16.

As shown in FIGS. 1-3, link 22 has a collar 26 at one end thereof which is fixedly attached to the housing of motor 16 so that when the housing of motor 16 turns, it rotates link 22. Link 22, through its pivotal connection 27 to link 22, actuates link 21 and through arm 23 moves arm 24 of potentiometer 25.

The output of the power supply formed by potentiometer 25 connected across a d.c. power supply comprising a positive terminal 28 and a negative terminal 29 is preset to work in a given range dependent on the diameter of the saw blade used in machine 10.

The torque required to turn the feed screw 14 depends on blade sharpness, hardness and size of the rock being cut.

The feed screw turns at the maximum preset rate when starting a cut. As the blade progresses into the cut, the force required increases if the resulting torque is greater than can be offset by the weights 18 attached to the end of link 22, and the motor body or casing will rotate. This rotation will cause arm 24 of the potentiometer to move to reduce its output voltage which is applied to motor 16, thus reducing the feed rate of the feed screw. The motor body and linkage system will remain in this position until a further torque change occurs, resulting in an increase or decrease in output voltage and speed of motor 16 responsive to the condition of the material being worked on.

In conjunction with the system disclosed, a system cutoff switch, such as micro-switch 30, may be employed which will open upon the linkage 20 moving into engagement therewith upon a predetermined increase of the reaction torque on motor 16 due to a dull blade, fractured rock and any other condition which would create torque in excess of the system's normal operating capabilities.

As shown in FIG. 3, the saw blade 17 may be rotated by an alternating current motor 16' which also may be simultaneously de-energized by a separate set of contacts 30A connected across an alternating current source 28' that are opened simultaneously by switch 30 when switch 30 opens to de-energize motor 16, thereby shutting down the complete machine when excessive torque is released by the infeed control mechanism.

Although but one embodiment of the invention has been shown and described, it will be apparent to those skilled in the art that various changes and modifications may be made therein without departing from the spirit of the invention or from the scope of the appended claims.

What is claimed is:

1. An apparatus for cutting or abrading materials having hardness variations comprising:
    a frame,
    a table for supporting a work piece movably mounted on said frame,
    a feed screw mounted on said frame and threadedly connected to said table for controlled movement of said work piece relative to said frame,
    an electric motor having a rotor journaled in its housing,
    said rotor being coupled to said feed screw for actuation thereof,
    said housing of said motor being free to rotate responsive to the reaction of the torque experienced by said feed screw and said rotor when the work piece engages a tool,
    a potentiometer control means for varying a source of power coupled to said electric motor,
    means connecting said housing to said control means for varying the electric power supplied to said electric motor in response to the position of said housing relative to said rotor of said electric motor reacting to the torque experienced by said rotor,
    said means connecting said housing to said control means comprises a pair of pivotally connected links with the free end of one link connected to said housing and the free end of the other link connected to said control means,
    switching means mounted on said frame for controlling the energization of said electric motor,
    said switching means being actuated to open circuit condition by a predetermined movement of said means connected to said housing, and
    means for mounting a tool on said frame against which the work piece carried by said table is moved adjacent to.

2. The apparatus set forth in claim 1 wherein:
    said tool comprises a rotating cutting tool.

3. The apparatus set forth in claim 2 in further combination with:
    motor means independent of said electric motor for rotating said tool.

4. The apparatus set forth in claim 1 wherein:
    said electric motor comprises a direct current motor.

5. The apparatus set forth in claim 1 in further combination with:
    a weight attached to the other end of said one link.

* * * * *